United States Patent
Pard et al.

(10) Patent No.: US 12,287,032 B2
(45) Date of Patent: Apr. 29, 2025

(54) METHOD FOR OPERATING A VEHICLE HAVING A DUAL-CLUTCH TRANSMISSION

(71) Applicant: BOMBARDIER RECREATIONAL PRODUCTS INC., Valcourt (CA)

(72) Inventors: Jean-Sebastien Pard, Tingwick (CA); Francois Giroux, Valcourt (CA); Guillaume Auger, Danville (CA); Alexandre Thibault, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 14 days.

(21) Appl. No.: 18/331,690

(22) Filed: Jun. 8, 2023

(65) Prior Publication Data

US 2024/0003419 A1    Jan. 4, 2024

Related U.S. Application Data

(60) Provisional application No. 63/357,559, filed on Jun. 30, 2022.

(51) Int. Cl.

| | | |
|---|---|---|
| *F16H 61/00* | (2006.01) | |
| *F16H 3/00* | (2006.01) | |
| *F16H 37/02* | (2006.01) | |
| *F16H 59/02* | (2006.01) | |
| *F16H 59/24* | (2006.01) | |
| *F16H 59/44* | (2006.01) | |

(Continued)

(52) U.S. Cl.
CPC ......... *F16H 61/0059* (2013.01); *F16H 3/006* (2013.01); *F16H 37/021* (2013.01); *F16H 59/02* (2013.01); *F16H 59/24* (2013.01); *F16H 59/44* (2013.01); *F16H 59/54* (2013.01); *F16H 59/56* (2013.01); *F16H 61/688* (2013.01); *F16H 2059/0221* (2013.01); *F16H 2059/446* (2013.01)

(58) Field of Classification Search
CPC .... F16H 61/0059; F16H 3/006; F16H 37/021; F16H 61/688; F16H 2059/446
USPC .......................................... 74/330, 335, 340
See application file for complete search history.

(56) References Cited

U.S. PATENT DOCUMENTS

| | | | |
|---|---|---|---|
| 8,584,781 | B1 | 11/2013 | Gauthier et al. |
| 2006/0248971 | A1* | 11/2006 | Inoue ................. F16H 61/0059 74/335 |

(Continued)

FOREIGN PATENT DOCUMENTS

WO    20210152167 A1    8/2021

*Primary Examiner* — Ha Dinh Ho
(74) *Attorney, Agent, or Firm* — BCF LLP

(57) ABSTRACT

A method for operating a vehicle having a dual-clutch transmission (DCT). The DCT includes first and second clutches; a first shaft operatively connected to the first clutch, the first clutch being selectively actuated to couple the first shaft to a clutch input member; a second shaft operatively connected to the second clutch, the second clutch being selectively actuated to couple the second shaft to the clutch input member; first and second driving members mounted to the first and second shafts respectively; and an output shaft operatively connecting the first and second driving members to a ground-engaging member of the vehicle. The method includes determining if the vehicle is substantially stationary; and in response to being substantially stationary, actuating the first and second clutches to cause simultaneous driving engagement of both the first and second shafts with the output shaft to thereby lock the output shaft.

19 Claims, 11 Drawing Sheets

(51) Int. Cl.
  *F16H 59/54*  (2006.01)
  *F16H 59/56*  (2006.01)
  *F16H 61/688*  (2006.01)

(56) References Cited

U.S. PATENT DOCUMENTS

| | | | |
|---|---|---|---|
| 2011/0167957 A1* | 7/2011 | Kato | F16H 61/0059 74/665 E |
| 2011/0314961 A1* | 12/2011 | Tanaka | F16H 61/688 74/665 A |
| 2017/0248197 A1* | 8/2017 | Muto | F16H 61/0059 |
| 2017/0248226 A1* | 8/2017 | Muto | F16H 61/0059 |
| 2022/0373079 A1* | 11/2022 | Szeppat | F16H 3/093 |

* cited by examiner

METHOD FOR OPERATING A VEHICLE HAVING A DUAL-CLUTCH TRANSMISSION

CROSS-REFERENCE

The present application claims priority to U.S. Provisional Patent Application No. 63/357,559, entitled "Method for Operating a Vehicle Having a Dual-Clutch Transmission," filed Jun. 30, 2022, the entirety of which is incorporated by reference herein.

FIELD OF TECHNOLOGY

The present technology relates to vehicles having a dual-clutch transmission (DCT).

BACKGROUND

Some vehicles, such as off-road vehicles (e.g., side-by-side vehicles (SSVs)), have a powertrain that includes a continuously variable transmission (CVT). Notably, CVTs may offer certain advantages over geared transmissions, including for instance seamless shifting between different gear ratios without loss of power during shifting, easier maintenance, and increased fuel efficiency amongst others. In off-road vehicles, CVTs are often connected to a geared sub-transmission to offer user-initiated shifting between different gear settings.

However, combining a CVT with a geared transmission can present challenges in maintaining the vehicle's performance in off-road conditions, and can also introduce issues related to operating a geared transmission. Furthermore, the CVT may be strained by the geared transmission which can cause wear and tear in the CVT (e.g., in the transmission belt). In addition, some drivers may not find the shifting offered by the geared transmission to be easy to perform.

Moreover, off-road vehicles are sometimes used for utility purposes and could be better adapted to the usage scenarios in such cases.

Thus there is a desire for a vehicle having a CVT that addresses at least in part some of these drawbacks.

SUMMARY

It is an object of the present technology to ameliorate at least some of the inconveniences present in the prior art.

According to one aspect of the present technology, there is provided a method for operating a vehicle comprising a dual-clutch transmission (DCT), the DCT comprising: a clutch input member operatively connected to an engine of the vehicle; a first clutch; a second clutch; a first shaft operatively connected to the first clutch, the first clutch being selectively actuated to couple the first shaft to the clutch input member; a second shaft operatively connected to the second clutch, the second clutch being selectively actuated to couple the second shaft to the clutch input member; at least one first driving member mounted to the first shaft; at least one second driving member mounted to the second shaft; and an output shaft operatively connecting the at least one first driving member and the at least one second driving member to at least one of a plurality of ground-engaging members of the vehicle. The method comprises: determining if the vehicle is substantially stationary based on at least one operating parameter of the vehicle; and in response to determining that the vehicle is substantially stationary, actuating the first clutch and the second clutch to cause simultaneous driving engagement of both the first shaft and the second shaft with the output shaft to thereby lock the output shaft.

In some embodiments, the at least one operating parameter of the vehicle includes at least one of: a duration of activation of a brake system of the vehicle; an operating parameter indicative of a throttle request of the engine; and a speed of the vehicle.

In some embodiments, the vehicle is determined to be substantially stationary in response to: the duration of activation of the brake system being greater than a predetermined brake activation time; the operating parameter indicative of the throttle request of the engine indicating that the throttle request is less than a predetermined throttle level; and the speed of the vehicle being less than a predetermined vehicle speed.

In some embodiments, the predetermined brake activation time is 0.5 seconds.

In some embodiments, the predetermined throttle level is 1%.

In some embodiments, the predetermined vehicle speed is 1 km/h.

In some embodiments, the operating parameter indicative of the throttle request is a position of an accelerator of the vehicle.

In some embodiments, the method further comprises: after actuating the first clutch pack and the second clutch pack, determining if the vehicle is nonstationary; in response to receiving a request for increasing a throttle request of the engine to a throttle level greater than a predetermined throttle level or determining that the vehicle is nonstationary: deactivating one of the first clutch and the second clutch to release driving engagement of a corresponding one of the first shaft and the second shaft with the output shaft; and controlling the first clutch and the second clutch according to a gear selection of a shifter of the vehicle.

In some embodiments, the vehicle is determined to be nonstationary in response to a speed of the vehicle being greater than a predetermine vehicle speed.

According to another aspect of the present technology, there is provided a vehicle comprising: a frame; a plurality of ground-engaging members operatively connected to the frame; and an internal combustion engine supported by the frame, the engine comprising a crankshaft configured to drive at least one of the ground-engaging members; a dual-clutch transmission (DCT) operatively connected to the engine, the DCT comprising: a clutch input member operatively connected to the driven pulley of the CVT to be driven thereby; a first clutch; a second clutch; a first shaft operatively connected to the first clutch, the first clutch being selectively actuated to couple the first shaft to the clutch input member; a second shaft operatively connected to the second clutch, the second clutch being selectively actuated to couple the second shaft to the clutch input member; at least one first driving member mounted to the first shaft; at least one second driving member mounted to the second shaft; and an output shaft operatively connecting the at least one first driving member and the at least one second driving member to the at least one of the ground-engaging members; and a controller configured to control actuation of the first clutch and the second clutch, the controller being operable to: determine if the vehicle is substantially stationary based on at least one operating parameter of the vehicle; and in response to determining that the vehicle is substantially stationary, actuate the first clutch and the second clutch to cause simultaneous driving engagement of both the first shaft and the second shaft with the output shaft to thereby lock the output shaft.

In some embodiments, the DCT comprises a sub-transmission operatively connected to the first shaft and the second shaft, the sub-transmission comprising: the output shaft; at least one first sub-transmission driven member mounted to the output shaft, the at least one first driving member being in driving engagement with the at least one first sub-transmission driven member; and at least one second sub-transmission driven member mounted to the output shaft, the at least one second driving member being in driving engagement with the at least one second sub-transmission driven member, a gear ratio between the at least one first driving member and the at least one first sub-transmission driven member being different from a gear ratio between the at least one second driving member and the at least one second sub-transmission driven member.

In some embodiments, the at least one operating parameter of the vehicle includes at least one of: a duration of activation of a brake system of the vehicle; an operating parameter indicative of a throttle request of the engine; and a speed of the vehicle.

In some embodiments, the controller determines that the vehicle is substantially stationary in response to: the duration of activation of the brake system being greater than a predetermined brake activation time; the operating parameter indicative of the throttle request of the engine indicating that the throttle request is less than a predetermined throttle level; and the speed of the vehicle being less than a predetermined vehicle speed.

In some embodiments, the predetermined brake activation time is 0.5 seconds.

In some embodiments, the predetermined throttle level is 1%.

In some embodiments, the predetermined vehicle speed is 1 km/h.

In some embodiments, the operating parameter indicative of the throttle request is a position of an accelerator of the vehicle.

In some embodiments, the vehicle further comprises a shifter for operating the DCT in at least two different gear settings; and the controller is operable to: after actuating the first clutch pack and the second clutch pack, determine if the vehicle is nonstationary; and in response to receiving a request for increasing a throttle request of the engine to a throttle level greater than a predetermined throttle level or determining that the vehicle is nonstationary: deactivate one of the first clutch and the second clutch to release driving engagement of a corresponding one of the first shaft and the second shaft with the output shaft; and control the first clutch and the second clutch according to the gear setting selected by the shifter.

In some embodiments, the vehicle is determined to be nonstationary in response to a speed of the vehicle being greater than a predetermined vehicle speed.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned objects and/or aspects, but do not necessarily have all of them. It should be understood that some aspects of the present technology that have resulted from attempting to attain the above-mentioned object may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a four-wheel, off-road vehicle having two side-by-side seats and a steering wheel (i.e. a side-by-side vehicle (SSV)). However, it is contemplated that at least some aspects of the present technology may apply to other types of vehicles such as, but not limited to, off-road vehicles having a straddle seat and a handlebar (i.e. an all-terrain vehicle (ATV)), off-road vehicles having a single bucket-type seat, off-road vehicles with more than four wheels, off-road vehicles having ground-engaging members other than wheels, and other types of vehicles.

Figure 1:
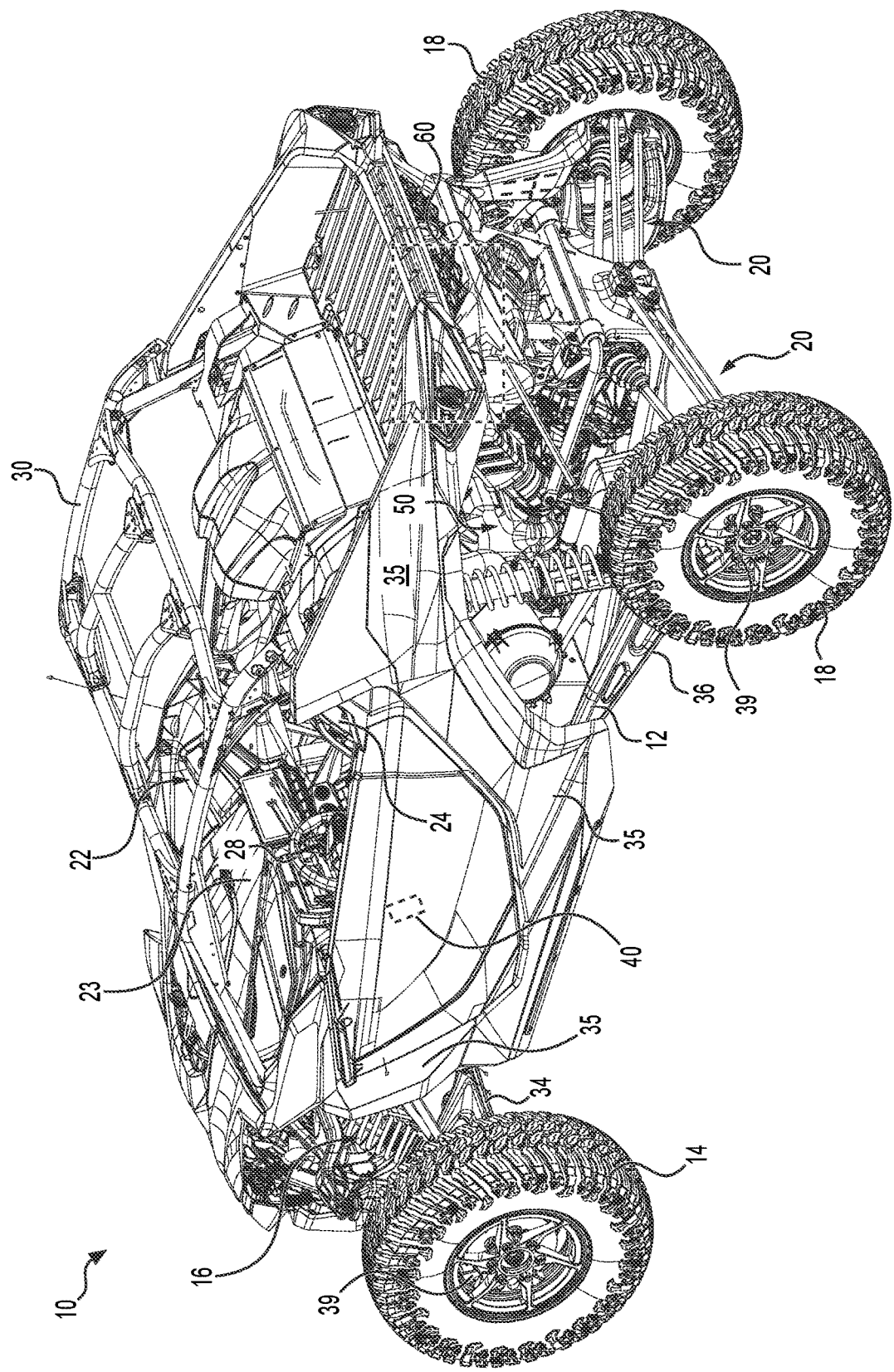
FIG. 1 is a perspective view taken from a top, rear, left side of an off-road vehicle according to an embodiment of the present technology.

The general features of the off-road vehicle 10 will now be described herein with respect to FIG. 1. The vehicle 40 has a frame 12. The frame 12 defines a central cockpit area 22 inside which are disposed a driver seat 24 and a passenger seat (not shown). In the present implementation, the driver seat 24 is disposed on the left side of the vehicle 10 and the passenger seat is disposed on the right side of the vehicle 10.

However, it is contemplated that the driver seat 24 could be disposed on the right side of the vehicle 10 and that the passenger seat could be disposed on the left side of the vehicle 10. It is also contemplated that the vehicle 10 could include a single seat for the driver, or a larger number of seats, or a bench accommodating the driver and at least one passenger. The vehicle 10 also includes a roll cage 30 connected to the frame 12 and extending at least partially over the driver seat 24 and the passenger seat. The frame 12 also has a front area 34 and a rear area 36 disposed forwardly and rearwardly of the central cockpit area 22 respectively.

The vehicle 12 includes left and right front wheels 14 connected to the frame 12 by a pair of front suspension assemblies 16. Left and right rear wheels 18 are connected to the frame 12 by a pair of rear suspension assemblies 20. The vehicle 10 has a brake system 38 (FIG. 10) including four brake assemblies 39 (two of which are shown in FIG. 1), each one being operatively connected to a respective one of the wheels 14, 18. Each brake assembly 39 includes a brake disc and a caliper disposed around its corresponding brake disc. Each caliper is connected to a corresponding brake line. Each caliper includes a pair of brake pads positioned on opposite sides of its respective brake disc. The brake assemblies are actuated by actuating the calipers by application of a fluid pressure in the brake lines, thereby causing the brake pads to apply pressure on their respective brake discs.

The vehicle 10 has a steering wheel 28 operatively connected to the front wheels 14 for controlling a steering angle of the front wheels 14. The driver operates the steering wheel 28 from the driver seat 24. The steering wheel 28 is disposed in front of the driver seat 24. A steering position sensor (not shown) is operatively connected to the steering wheel 28, via a steering assembly, for determining a steering angle of the front wheels 14. The vehicle 10 also includes a dashboard 23 disposed forward of the driver seat 24 and the passenger seat. An accelerator 40 (schematically illustrated in FIG. 1) in the form of a throttle pedal is disposed over the floor of the cockpit area 22 below the steering wheel 28 and in front of the driver seat 24. An accelerator position sensor 41 (FIG. 10) is operatively connected to the accelerator 40 to sense movement thereof caused by the driver in operation.

A plurality of body panels 35 are provided on the vehicle 10 to conceal the internal components of the vehicle 10 and to enclose the cabin of the vehicle 10.

Figure 4:
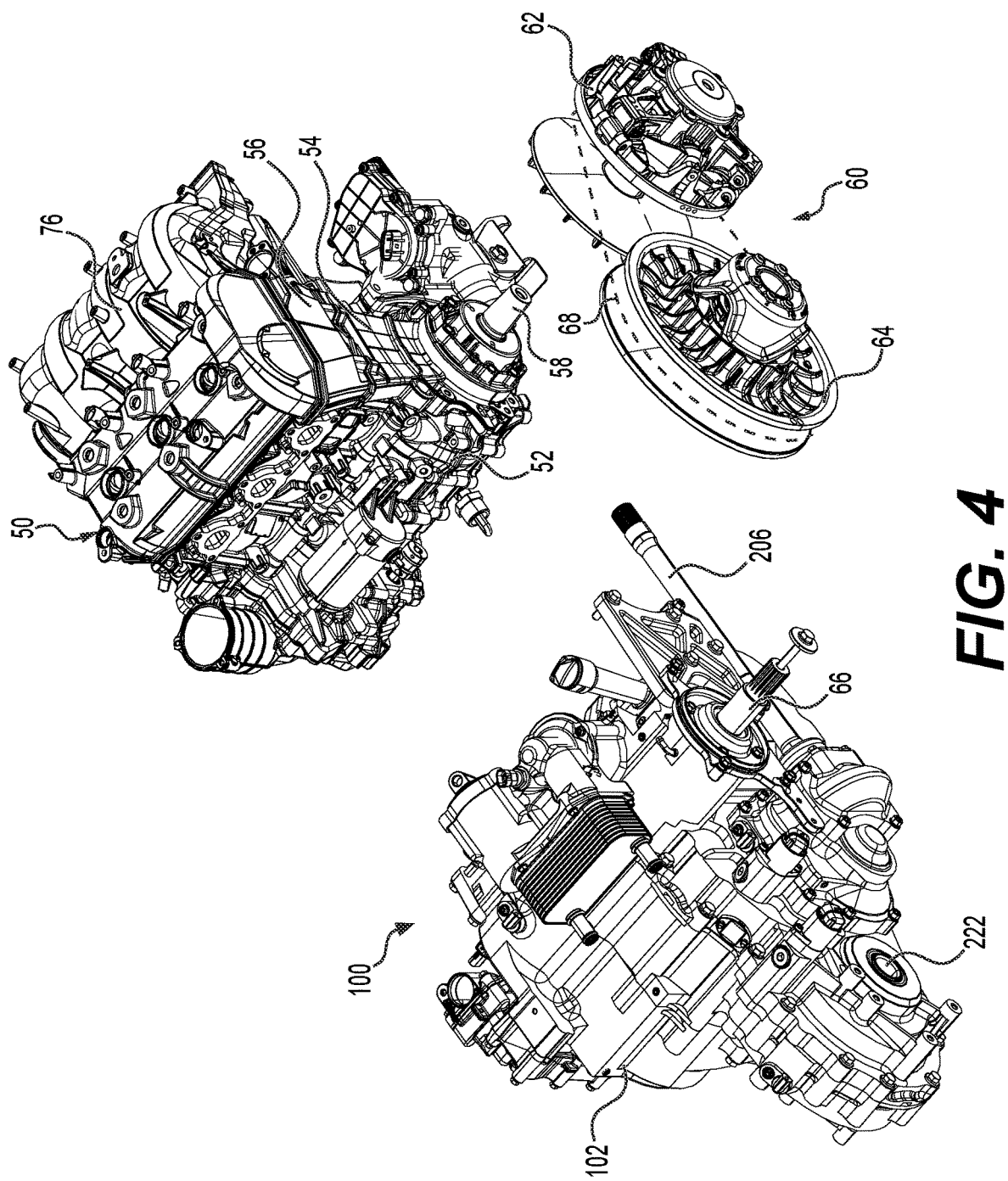
FIG. 4 is perspective view taken from a top, rear, right side of an engine, part of a continuously variable transmission (CVT) and a dual-clutch transmission (DCT) of the powertrain of FIG. 2, shown in an exploded configuration.

A powertrain of the vehicle 10 includes a motor 50 (partially shown in FIG. 1) that is connected to the frame 12 in a rear portion of the vehicle 10. In this embodiment, the motor 50 is an internal combustion engine. As best shown in FIG. 4, the engine 50 has a crankcase 52, a cylinder block 54 defining three cylinders (not shown) connected on top of the crankcase 52 and a cylinder head 56 connected on top of the cylinder block 54. The engine 50 has a crankshaft (not shown) disposed in the crankcase 52 and driven by the motion of the engine's pistons (not shown) disposed in the cylinders. An engine output shaft 58 (FIGS. 4, 5) extends outwardly from the crankcase 52 on a right side thereof and is connected to the crankshaft to rotate therewith. As such, in this embodiment, the engine output shaft 58 extends along a lateral direction of the vehicle 10. The engine output shaft 58 operatively connects the crankshaft to the front and rear wheels 14, 18 for driving thereof. In other embodiments, only the front wheels 14 or only the rear wheels 18 may be driven by the crankshaft.

Figure 2:
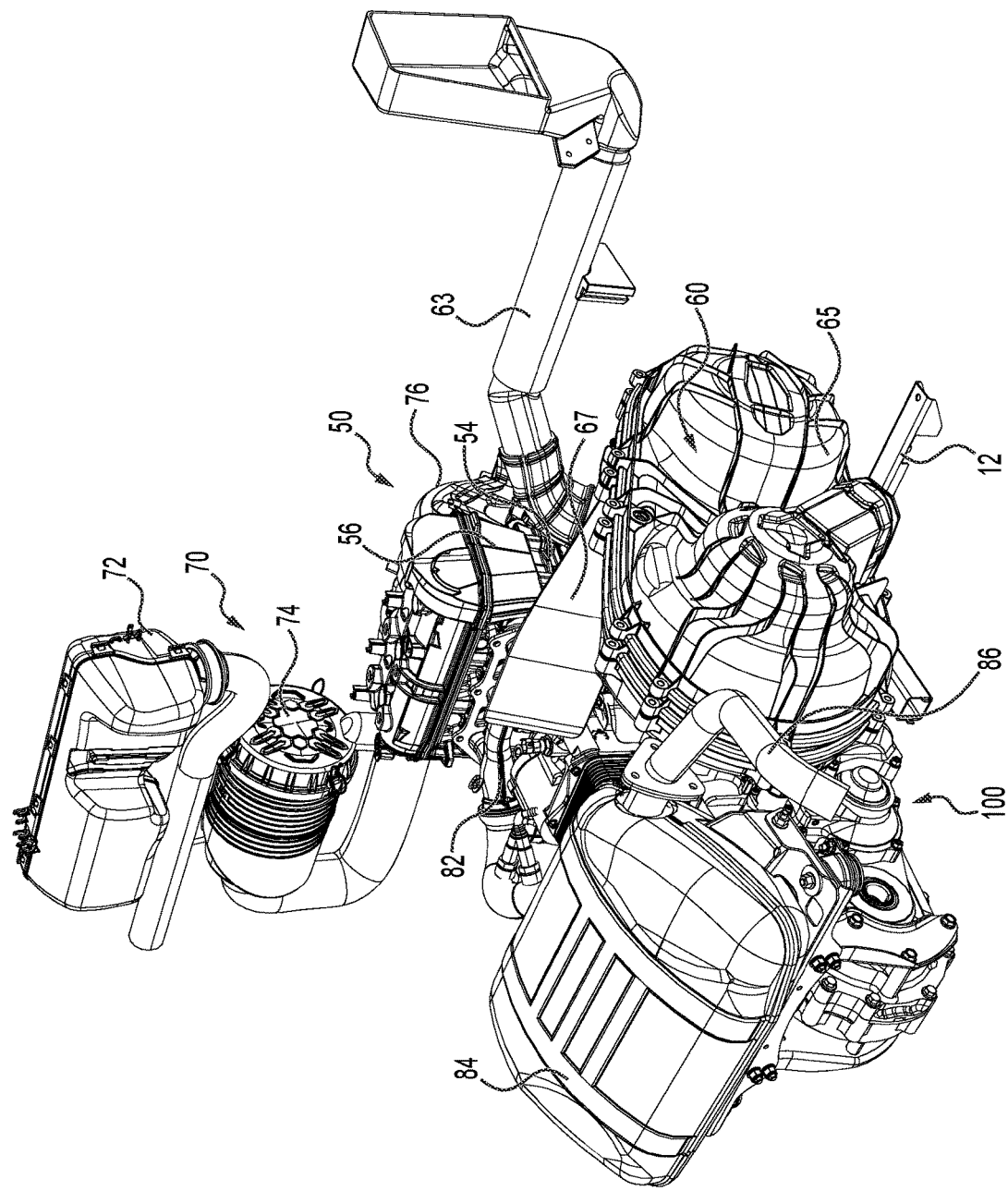
FIG. 2 is a perspective view taken from a top, rear, right side of part of a powertrain of the vehicle of FIG. 1.
Figure 3:
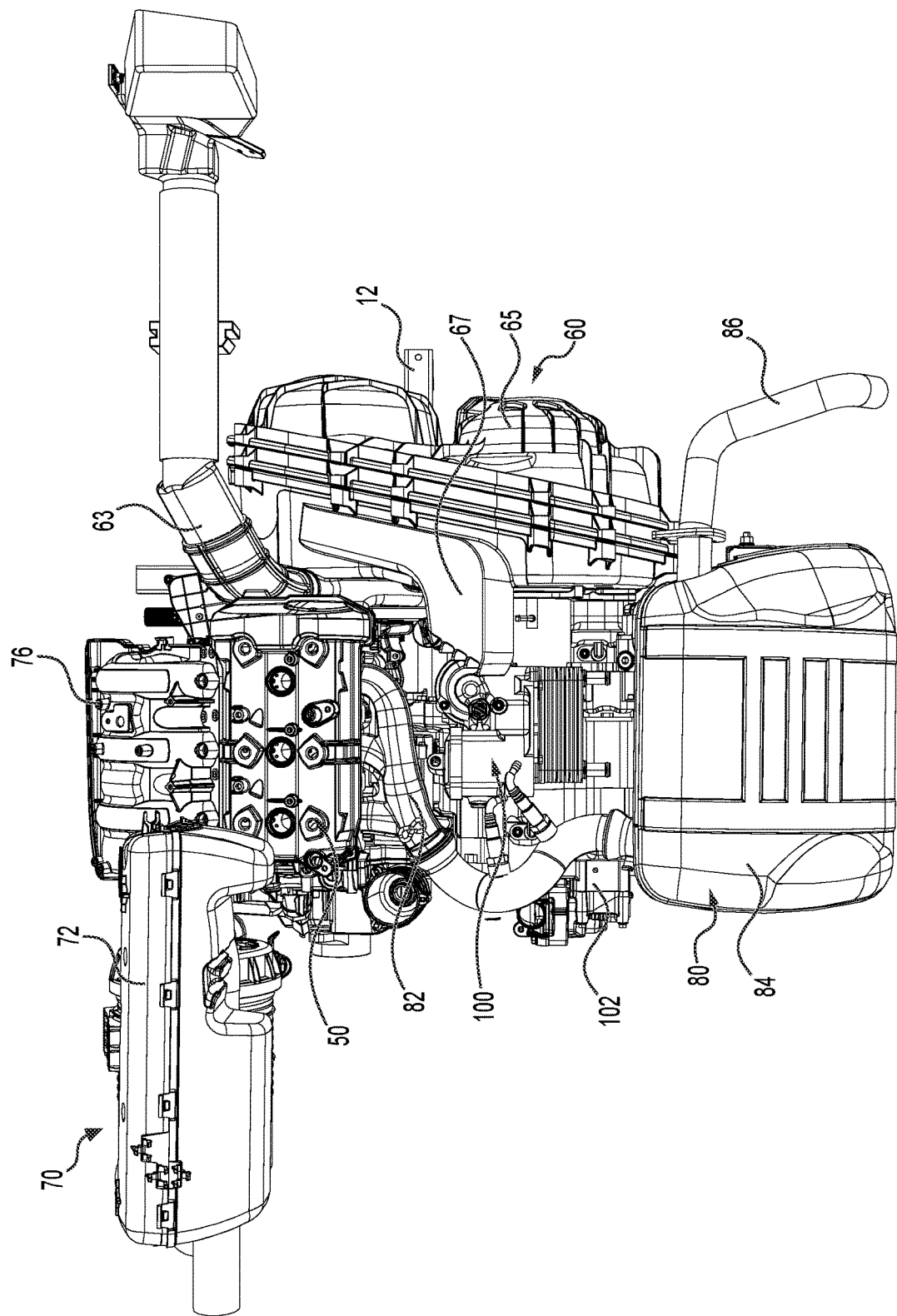
FIG. 3 is a top plan view of the part of the powertrain of FIG. 2.

As shown in FIGS. 2 and 3, an air intake system 70 is provided to feed air to respective inlet ports of the engine's cylinders. The air intake system 70 includes an airbox 72, an air cleaner 74 downstream from the airbox 72 and an air intake plenum 76 that is connected to the engine 50. An exhaust system 80 discharges exhaust gases from the engine 50. The exhaust system 80 includes an exhaust manifold 82 connected to the engine 50 to receive exhaust gases from respective exhaust ports of the cylinders of the engine 50, a resonator 84 connected to the exhaust manifold 82, and a tail pipe 86 connected to the resonator 84. The air intake system 70 and the exhaust system 80 may be configured differently in other embodiments.

The vehicle 10 includes an engine control module (ECM) for monitoring and controlling various operations of the engine 50. The ECM is communicatively connected to the accelerator position sensor 41 for receiving signals for controlling a throttle valve (not shown) of the engine 50. The engine 50 also includes a throttle position sensor (not shown) operatively connected to the throttle valve and communicatively connected to the ECM for monitoring the position of the throttle valve.

Figure 5:
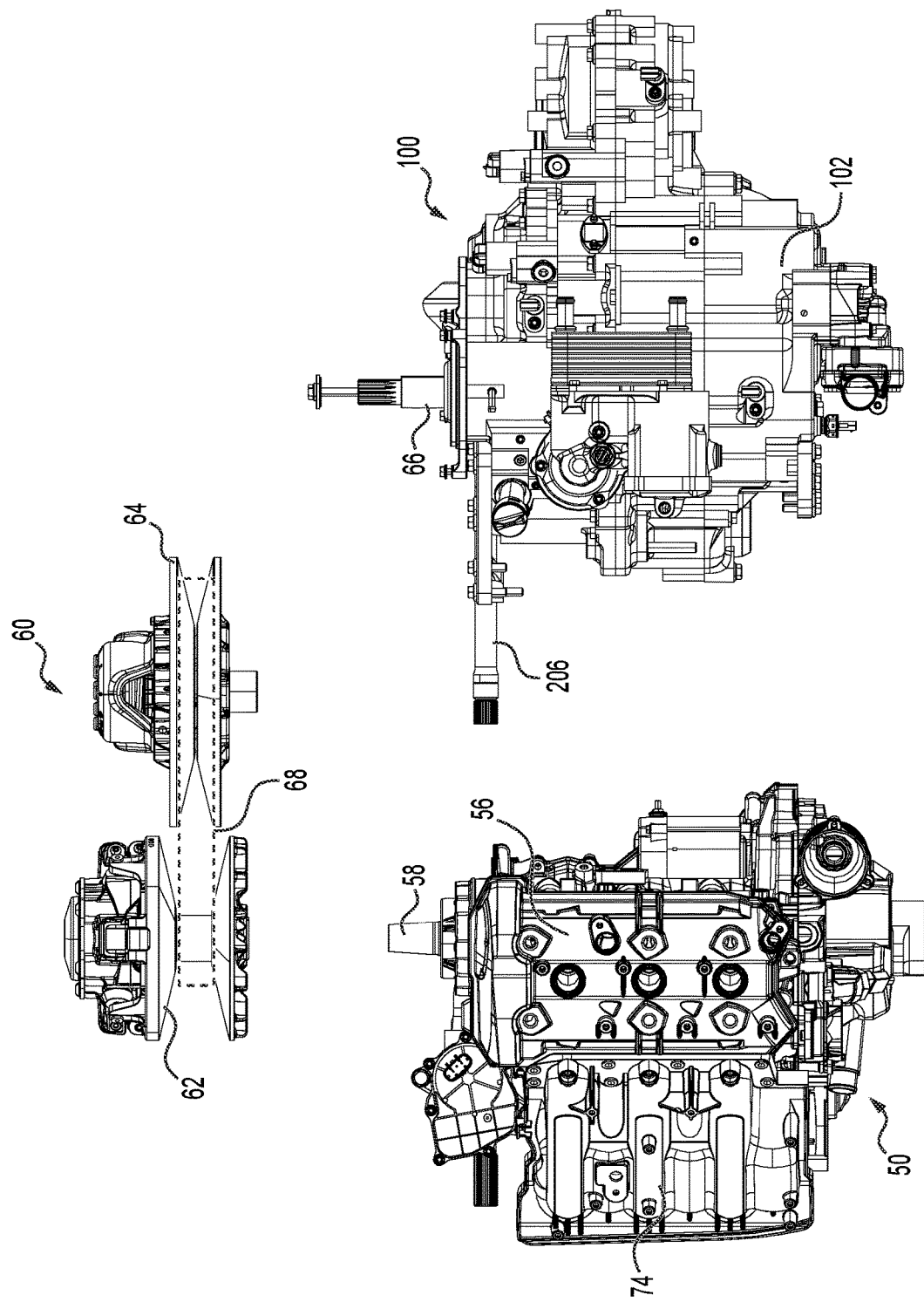
FIG. 5 is a top plan view of the engine, the part of the CVT and the DCT of FIG. 4, shown in the exploded configuration.
Figure 6:
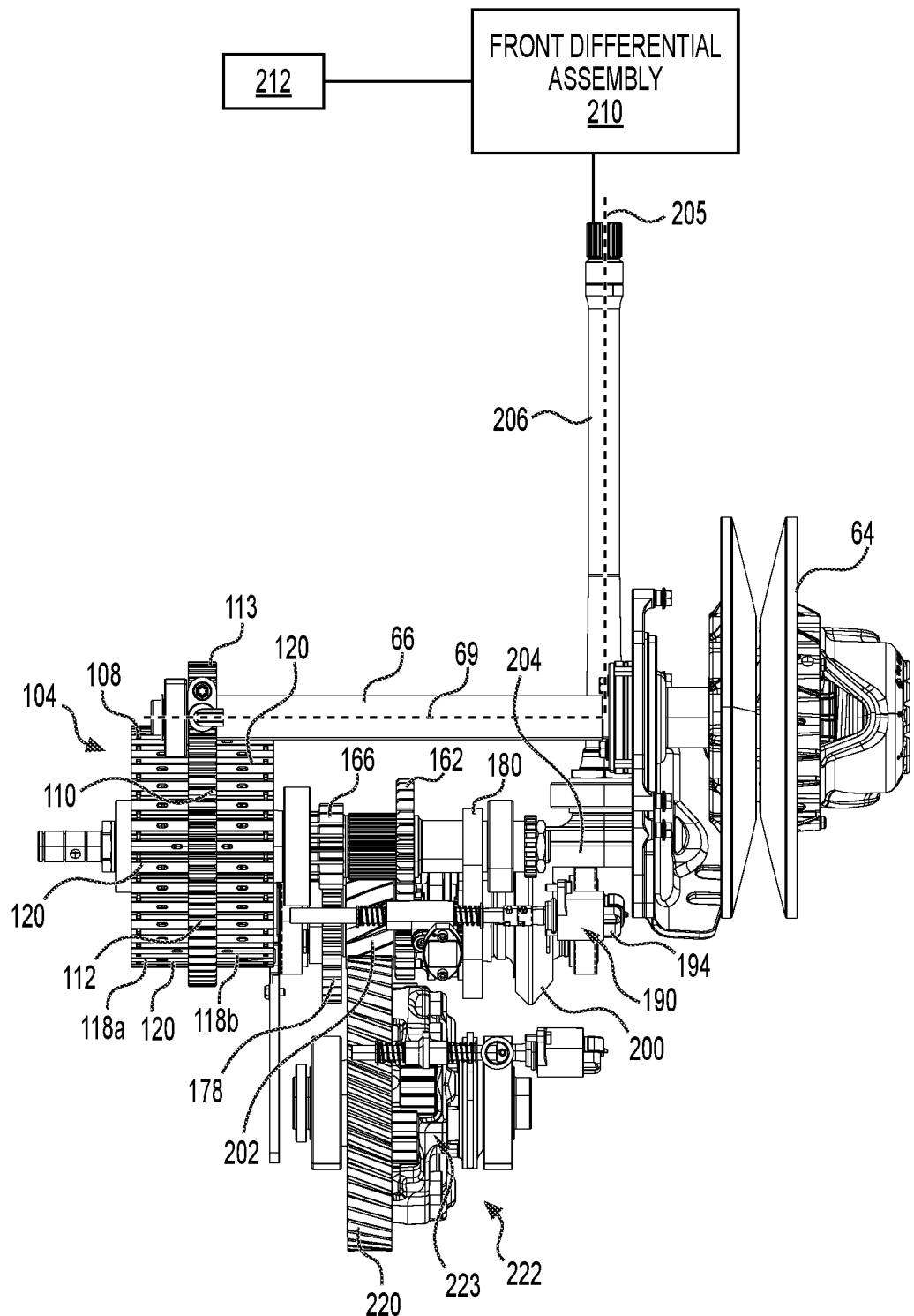
FIG. 6 is a top plan view of part of the powertrain of FIG. 2, including part of the CVT and internal components of the DCT.

The engine 50 is connected to a continuously variable transmission (CVT) 60 (shown schematically in FIG. 1) disposed on a right side of the engine 50. As shown in FIGS. 4 and 5, the CVT 60 includes a drive pulley 62 mounted to the engine output shaft 58, a driven pulley 64 mounted to a countershaft 66 for rotation therewith, and a transmission belt 68 (shown schematically in FIGS. 4 and 5) disposed around both pulleys 62, 64 to transmit torque from the drive pulley 62 to the driven pulley 64. As shown in FIG. 6, the countershaft 66 rotates about a countershaft axis 69 that extends laterally. Returning to FIGS. 4 and 5, each of the pulleys 62, 64 includes a movable sheave that can move axially relative to a fixed sheave to modify an effective diameter of the corresponding pulley 62, 64. The drive pulley 62 is a centrifugal pulley in that the sheaves thereof move in response to a centrifugal force applied thereon. The effective diameters of the pulleys 62, 64 are in inverse relationship. In the illustrated embodiment, the CVT 60 is a purely mechanical CVT 60, in which the diameter of the drive pulley 62 increases with increasing rotational speed of the drive pulley 62 (i.e., with increasing engine speed). The effective diameter of the driven pulley 64 therefore decreases when the torque required at the countershaft 66 increases. The CVT 60 may thus be referred to as an "unassisted" CVT in that a gear ratio of the CVT 60 (i.e., an effective diameter of the driven pulley 64 over the effective diameter of the drive pulley 62) is automatically mechanically adjusted in accordance with the speed of the engine 50 and the torque requirement at the countershaft 66. It is contemplated that, in other embodiments, the CVT 60 could be an assisted CVT such as a hydraulic CVT.

As shown in FIGS. 2 and 3, a CVT housing 65 encloses the drive pulley 62, the driven pulley 64 and the transmission belt 68 therein. In this embodiment, an air intake 63 is fluidly connected to the CVT housing 65 for feeding air thereto from the surrounding environment in order to cool the components of the CVT 60. An air exhaust 67 is also fluidly connected to the CVT housing 65 to discharge heated air from the CVT housing 65. The air exhaust 67 may be oriented to discharge the heated air to warm the occupants of the vehicle 10.

The powertrain of the vehicle 10 also includes a dual-clutch transmission (DCT) 100 that is operatively connected to the CVT 60. In this embodiment, the DCT 100 is disposed rearwardly from the engine 50. The DCT 100 has a housing 102 for enclosing the internal components thereof. The housing 102 may be configured to implement a hydraulic system of the DCT 100 that ensures the routing of fluid (e.g., oil) to different components of the DCT 100 for cooling and/or lubrication thereof. Routing of fluid for actuation of the clutches of the DCT 100 is described in more detail below. As shown in FIG. 4, the countershaft 66 that is connected to the driven pulley 64 of the CVT 60 extends into the housing 102 of the DCT 100. As will be described below, in this embodiment, a transaxle 222 (FIG. 6) is also integrated into the housing 102 of the DCT 100, in a rear portion thereof, and therefore the DCT 100 could also be referred to as being a "dual-clutch transaxle". It is contemplated that the transaxle 222 could be separate from the DCT 100 in other embodiments (i.e., not enclosed within the housing 102).

Figure 7:
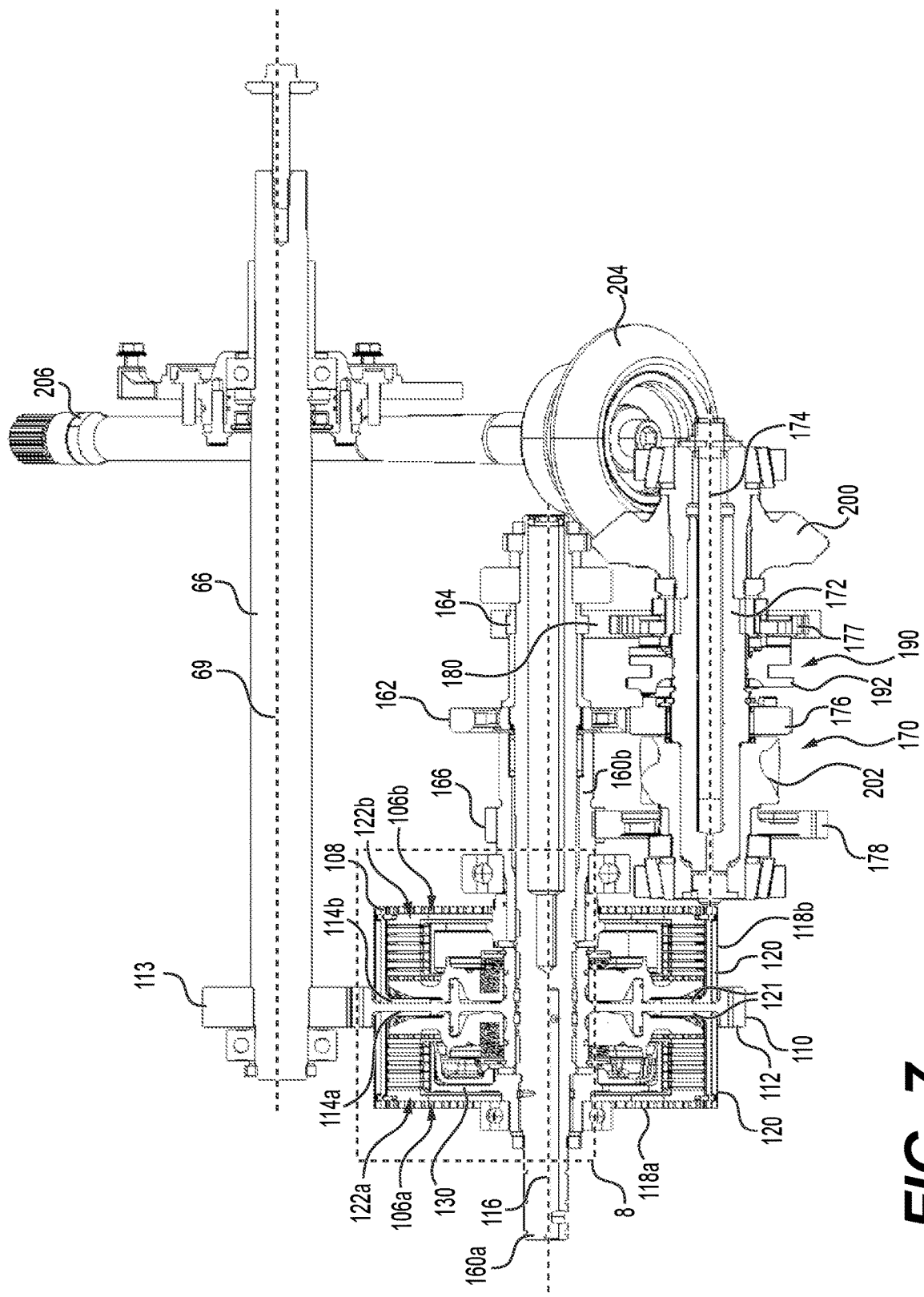
FIG. 7 is a perspective view taken from a top and rear side of a cross-section of the part of the powertrain of FIG. 6.

With reference to FIG. 6, the DCT 100 includes a dual-clutch 104 having left and right clutches 106a, 106b which are actuatable in a manner that will be described in greater detail below. Notably, the clutches 106a, 106b are closed (i.e., actuated to their respective fully closed positions) to transmit motion to respective shafts or opened to cease transmitting motion to the respective shafts. The dual-clutch 104 includes a clutch pack drum 108 that is adapted to rotate inside the housing 102, and a central clutch gear 110 connected to the clutch pack drum 108. The central clutch gear 110 has teeth 112 adapted to mesh with the teeth of a driving gear 113 mounted to the countershaft 66. The central clutch gear 110 is thus operatively connected to the driven pulley 64 via the output gear 113 and the countershaft 66 to be driven thereby. As the central clutch gear 110 provides the input into the dual-clutch 104, the central clutch gear 110 may be referred to as a "clutch input member". As shown in FIG. 7, the central clutch gear 110 has a left face 114a and a right face 114b. The central clutch gear 110 defines a clutch gear plane (not shown) and a clutch gear rotation axis 116 normal to the clutch gear plane. It is to be appreciated that the clutch gear rotation axis 116 is parallel to the countershaft rotation axis 69.

Figure 8:
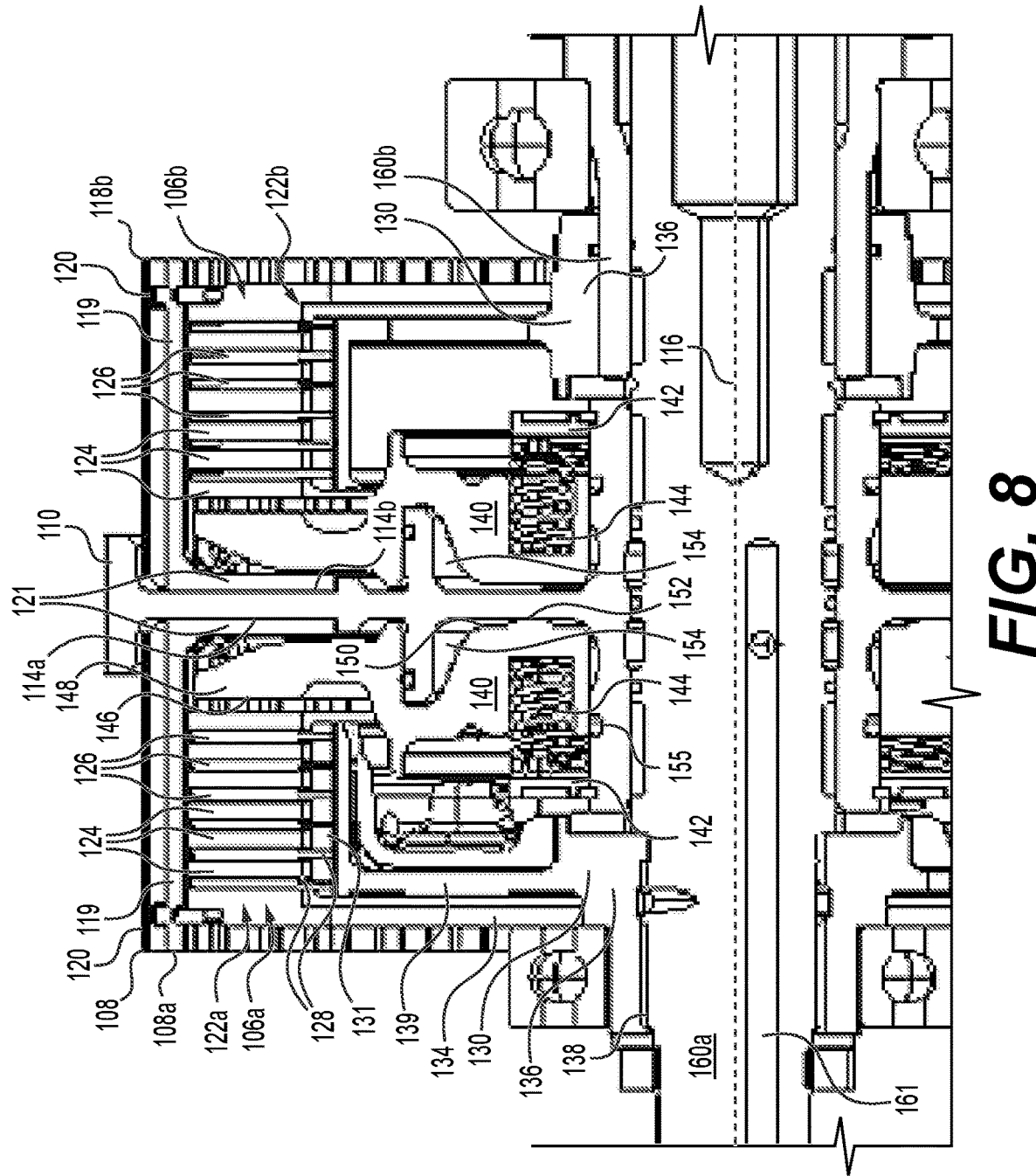
FIG. 8 is detailed view of section 8 in FIG. 7.

Referring to FIGS. 7 and 8, the clutch pack drum 108 includes a left clutch pack basket 118a disposed on a left side of the central clutch gear 110, and a right clutch pack basket 118b disposed on a right side of the central clutch gear 110. The left and right clutch pack baskets 118a, 118b are interconnected by fasteners that extend through the central clutch gear 110 to connect the left and right clutch pack baskets 118a, 118b to the central clutch gear 110. The left and right clutch pack baskets 118a, 118b are identical. In some implementations, the left and right clutch pack baskets 118a, 118b are symmetrical about the clutch gear plane. The left and right clutch pack baskets 118a, 118b could be structured otherwise in other implementations. Each of the left and right clutch pack baskets 118a, 118b has a cylindrical wall 120 defining internal splines 119, and an end wall 121 normal to the cylindrical wall 120 and abutting a corresponding one of the left and right faces 114a, 114b of the central clutch gear 110.

Turning now to FIG. 8, the left clutch 106a will be described in detail first. The operation of the left and right clutches 106a, 106b will be described further below. The left clutch 106a has a left clutch pack 122a that is received in the clutch pack basket 118a and is disposed to the left of the central clutch gear 110. The clutch pack 122a includes a plurality of clutch plates 124 having teeth (not shown) extending away from the clutch gear rotation axis 116 and engaging the splines 119 of the clutch pack basket 118a for rotating with the clutch pack drum 108. The clutch plates 124 are movable axially in a direction defined by the clutch gear rotation axis 116. The clutch plates 124 have disc surfaces including relatively low friction material. The left clutch pack 122a further includes a plurality of clutch disks 126 disposed alternatingly with the clutch plates 124 in the direction defined by the clutch gear rotation axis 116. The clutch disks 126 have disc surfaces including a relatively high friction material. The clutch disks 126 have teeth 128 extending towards the clutch gear rotation axis 116. The clutch disks 126 are also movable axially in the direction defined by the clutch gear rotation axis 116. As will become apparent from the description below, when the clutch disks 126 are selectively engaged by the clutch plates 124, the clutch disks 126 rotate with the clutch pack drum 108.

A left clutch hub 130 is received in the clutch pack 122a and is disposed to the left of the central clutch gear 110. The clutch hub 130 defines splines 131 structured to engage with the teeth 128 of the clutch disks 126 of the clutch pack 122a. The clutch disks 126 are movable axially relative to the clutch hub 130 in the direction defined by the clutch gear rotation axis 116 as the teeth 128 slide axially in the splines 131. When the clutch disks 126 are selectively engaged by the clutch plates 124, the clutch hub 130 rotates with the clutch pack drum 108. The clutch hub 130 has three arms 134 (one of which are shown in FIG. 8) connecting a rim portion of the clutch hub 130 (defining the splines 131) to a central portion 136 of the clutch hub 130. The central portion 136 defines splines 138.

A lubrication cover 139 is also received in the clutch pack 122a. The lubrication cover 139 is disposed to the left of the central clutch gear 110 and to the right of the left clutch hub 130. The lubrication cover 139 and the clutch hub 130 are interconnected. The lubrication cover 139 defines a plurality of apertures (not shown) on a rim portion thereof. The lubrication cover 139 defines passages (not shown) that are adapted for allowing flow of fluid therethrough.

As shown in FIG. 8, the left clutch 106a also includes a pressure plate 140 disposed to the left of the central clutch gear 110. The pressure plate 140 is disposed between the central clutch gear 110 and the lubrication cover 139. A ring 142 is connected to a hub of the central clutch gear 110, and coil spring assemblies 144 interconnect the pressure plate 140 to the central clutch gear 110. The pressure plate 140 rotates with the central clutch gear 110, and is movable axially in the direction of the central gear rotation axis 116 upon compression and extension of the coil spring assemblies 144. The pressure plate 140 has a left face 146 including a rim portion 148. The rim portion 148 of the pressure plate 140 is structured to selectively engage the clutch plate 124 that is closest to the central clutch gear 110. The pressure plate 140 also has a right face 150 where six pads 152 project therefrom. The pads 152 are structured for abutting the left face 114a of the central clutch gear 110 and to leave a spacing between the left face 114a of the central clutch gear 110 and the right face 150 of the pressure plate 140. A chamber 154 is defined between the left face 114a of the central clutch gear 110 and the right face 150 of the pressure plate 140. Seals 155 are disposed between the pressure plate 140 and the central clutch gear 110 to prevent fluid from escaping the chamber 154 through the regions where the seals 155 extend. The pressure plate 140 further defines a pressure plate passage (not shown) extending between the left and right faces 146, 150. The pressure plate passage is adapted for allowing flow of fluid therethrough.

A shaft 160a is connected to the left clutch hub 130 via teeth (not shown) engaging the splines 138 of the central portion 136 of the left clutch hub 130. The shaft 160a is coaxial with the clutch gear rotation axis 116. The shaft 160a defines passages 161 (one of which is shown in FIG. 8) adapted for flowing fluid therethrough. Referring to FIGS. 6 and 7, driving members 162, 164 are mounted to the shaft 160*a*, at a location to the right of the clutch pack drum 108, to rotate with the shaft 160*a* about the central gear rotation axis 116. In particular, in this embodiment, the driving members 162, 164 are a transmission gear 162 and a driving sprocket 164 respectively. It is contemplated that more or fewer driving members could be mounted to the shaft 160*a* in other embodiments.

When fluid is selectively supplied in one of the passages 161 of the shaft 160*a* from a pump 75 (FIG. 10), fluid flows through the shaft 160*a* in the passage 161, through passages (not shown) defined by the central clutch gear 110 and into the chamber 154. Since the pads 152 abut the left face 114*a* of the central clutch gear 110, fluid flows through the spacing between the pressure plate 140 and the central clutch gear 110, and fills the chamber 154. The pads 152 are thus structured for selectively allowing flow of fluid from the passage 161 to the chamber 154. When the left clutch 106*a* is selectively actuated, fluid is selectively supplied with sufficient pressure by the pump 75, and the pressurized fluid in the chamber 154 overcomes the biasing force of the coil spring assemblies 144 and moves the pressure plate 140 axially away from the central clutch gear 110 (i.e. toward the left of the central clutch gear 200). This closes the left clutch 106*a*, notably causing the pressure plate 140 to selectively squeeze the clutch plates 124 and the clutch disks 126 together for engaging the clutch plates 124 with the clutch disks 126. The left clutch hub 130 and the lubrication cover 139 are thus rotatable with the clutch pack drum 108 and the central clutch gear 110, and the shaft 160*a* is coupled to the central clutch gear 110 and therefore drives the driving members 162, 164 about the central gear rotation axis 116.

As some of the fluid escapes the chamber 154 through the pressure plate passage, fluid flows in the front clutch pack 122*a* and lubricates and cools the clutch plates 124, the clutch disks 126, and the clutch pack basket 118*a*. Fluid flows through holes of the clutch pack basket 118*a*, is collected in the housing 102 and is returned to the pump 75 for recirculation in the DCT 100. It is thus to be understood that in order for the pressure plate 140 to selectively squeeze the clutch pack 122*a*, pressurized fluid is continuously supplied in the chamber 154 by the pump 75.

The left clutch 106*a* may also be lubricated and cooled by fluid routed through the other passages 161 defined by the shaft 160*a*.

Once the left clutch 106*a* is deactivated (i.e., opened), the pump 75 substantially ceases pressurizing the chamber 154 and fluid is thus discharged from the chamber 154, and the pressure plate 140 is biased by the coil spring assemblies 144 back against the left face 114*a* of the central clutch gear 110. The clutch plates 124 and clutch disks 126 are thus disengaged from each other and the shaft 160*a* is uncoupled from the central clutch gear 110.

The right clutch 106*b* is, for the most part, a mirror image of the left clutch 106*a* about the gear plane of the central clutch gear 110. As such, only the differences between the right clutch 106*b* and the left clutch 106*a* will be described herein. The parts of the right clutch 106*b* corresponding to those of the first left 106*a* have been identified with the same reference numerals.

As shown in FIG. 8, a hollow shaft 160*b* is connected to the right clutch hub 130 of the right clutch 106*b* via the splines (not shown) defined in the central portion 136 of the clutch hub 130. The shaft 160*a* extends through the shaft 160*b* such that the shafts 160*a*, 160*b* are coaxial. A driving member 166 is mounted to the shaft 160*b*, at a location to the right of the clutch pack drum 108, to rotate therewith about the central gear rotation axis 116. In this embodiment, the driving member 166 is a transmission gear 166. It is contemplated that additional driving members could be mounted to the shaft 160*b* in other embodiments.

When the right clutch 106*b* is selectively actuated to the fully closed position, fluid is selectively supplied with sufficient pressure by the pump 75 through a different one of the passages 161 of the shaft 160*a*, and the pressurized fluid in the chamber 154 of the right clutch 106*b* overcomes the biasing force of the coil spring assemblies 144 and moves the pressure plate 140 axially away from the central clutch gear 110 (i.e. toward the right of the central clutch gear 200). This closes the right clutch 106*b*, notably causing the pressure plate 140 to selectively squeeze the clutch plates 124 and the clutch disks 126 together for engaging the clutch plates 124 with the clutch disks 126. The right clutch hub 130 and the lubrication cover 139 are thus rotatable with the clutch pack drum 108 and the central clutch gear 110, and the shaft 160*b* is coupled to the central clutch gear 110 and therefore drives the driving member 166 about the central gear rotation axis 116.

A more complete description of a dual-clutch of the type of the dual-clutch 104 can be found in International Patent Application Publication No. WO 2021/152167 A1, published on Aug. 5, 2021, the entirety of which is incorporated by reference herein.

During regular operation, only one of the left clutch 106*a* and the right clutch 106*b* is actuated to its fully closed position at the same time so that only the shaft 400*a* or the shaft 400*b* is coupled to the central clutch gear 110 at any one time. However, as will be described in greater detail further below, in some embodiments, in some operational conditions, both the left clutch 106*a* and the right clutch 106*b* could be actuated simultaneously.

The DCT 100 also has a sub-transmission 170 enclosed within the housing 102 and operatively connected to the shafts 160*a*, 160*b*. The sub-transmission 170 includes an output shaft 172 that operatively connects the driving members 162, 164, 166 to the front and rear wheels 14, 18. The output shaft 172 extends along an output shaft axis 174 that is parallel to the central gear rotation axis 116. The sub-transmission 170 has driven members 176, 177, 178 that are mounted to the output shaft 172 and are in driving engagement with respective ones of the transmission gears 162, 166 and the sprocket 164. In particular, the driven members 176, 178 of the sub-transmission 170 are gears that are meshed with the gears 162, 166, while the driven member 177 is a driven sprocket that is operatively connected to the driving sprocket 164. A chain 180 is wrapped around the sprockets 164, 177 to operatively connect the driving sprocket 164 to the driven sprocket 177.

The transmission gear 176 and the driven sprocket 177 mounted to the output shaft 172 are in selective driving engagement with the output shaft 172 so that, at any given time, only one or neither of the transmission gear 176 and the driven sprocket 177 drives the output shaft 172. In particular, a shifter 190 of the sub-transmission 170 selectively drivingly engages one of the transmission gear 176 and the driven sprocket 177 with the output shaft 172. The shifter 190 includes a dog clutch 192 mounted to the output shaft 172 for rotating together with the output shaft 172. The dog clutch 192 is disposed between the transmission gear 176 and the driven sprocket 177 and is movable along the output shaft axis 174 to selectively engage one of the transmission gear 176 and the driven sprocket 177 to rotate therewith and thereby transmit motion to the output shaft 172.

Figure 10:
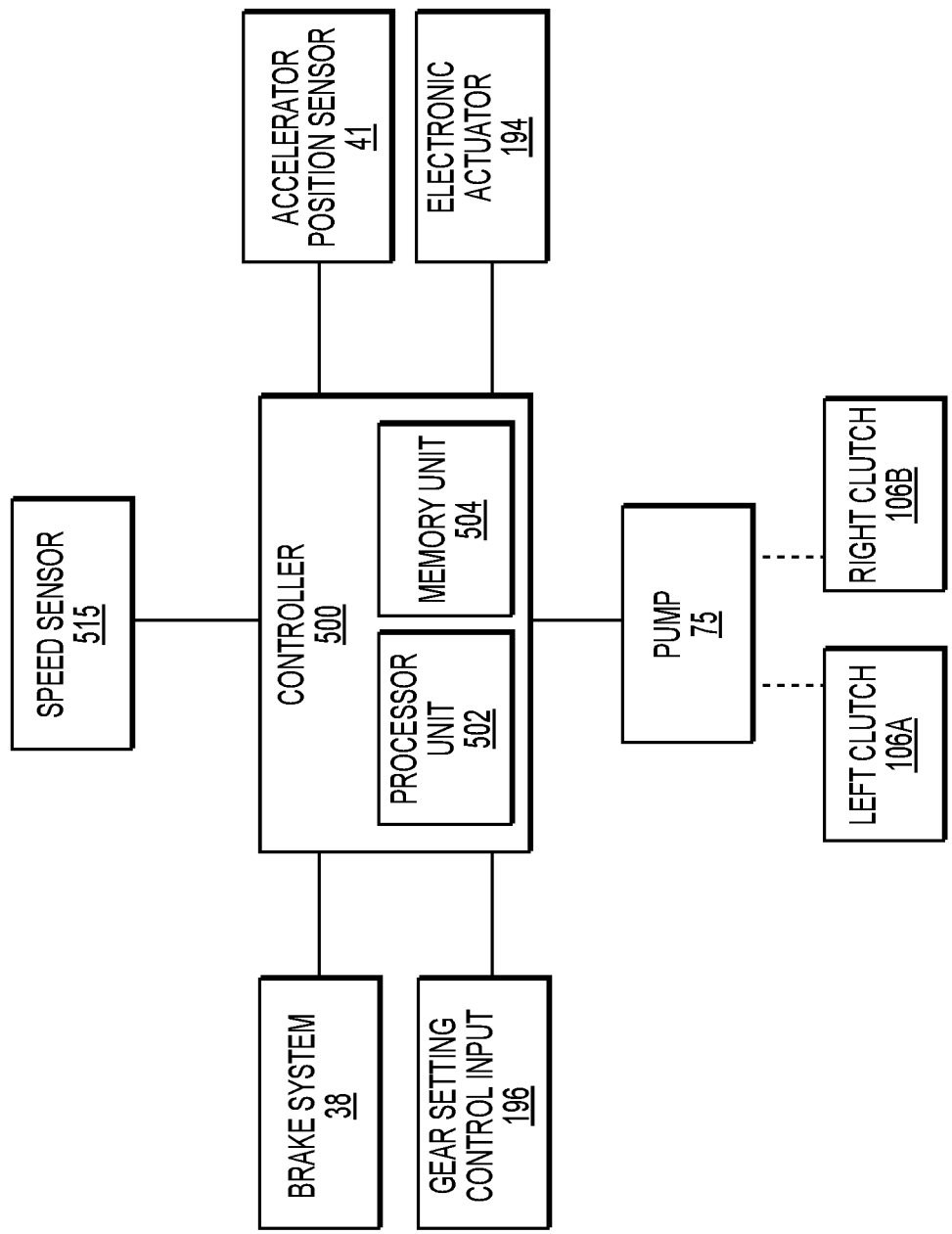
FIG. 10 is a block diagram of a controller for controlling operation of the DCT of FIG. 4.

With reference to FIGS. 6 and 10, in this embodiment, the shifter 190 has an electronic actuator 194 that is controlled by a controller 500. As shown in FIG. 10, the controller 500 is also in communication with a gear setting control input 196 that is operable by the driver of the vehicle to select a gear setting in which the DCT 100 should operate. That is, the controller 500 controls the electronic actuator 194 on the basis of a signal received from the gear setting control input 196. In this embodiment, the gear setting control input 196 includes a plurality of buttons disposed in the cabin of the vehicle 10 and are operable by the user to select the gear setting in which to operate the DCT 100. When the signal from the gear setting control input 196 indicates operation of the DCT 100 in a "high gear" associated with a high output speed of the DCT 100, the electronic actuator 194 moves the dog clutch 192 leftward to engage the transmission gear 176 and thereby couple the transmission gear 176 to the output shaft 172. As will be understood, when the DCT 100 operates in the high gear, the right clutch 106b is open and the left clutch 106a is closed such that the shaft 160a is coupled to the central clutch gear 110. When the signal from the gear setting control input 196 indicates operation of the DCT 100 in a "low gear" associated with a high torque output of the DCT 100, the controller 500, which is in communication with the pump 75, causes the left clutch 106a to open (i.e., to be deactivated) and the right clutch 106b to close such that the shaft 160b drives the output shaft 172 via the transmission gears 166, 178. When the signal from the gear setting control input 196 indicates operation of the DCT 100 in a "reverse gear", the electronic actuator 194 moves the dog clutch 192 rightward to engage the driven sprocket 177 and thereby couple the driven sprocket 177 to the output shaft 172. As such, the output shaft 172 can be rotated in a reverse rotation direction. As will be understood, when the DCT 100 operates in the reverse gear, the right clutch 106b is open and the left clutch 106a is closed such that the shaft 160a is coupled to the central clutch gear 110. When the signal from the gear setting control input 196 indicates operation of the DCT 100 in a "neutral gear", the controller 500 causes both clutches 106a, 106b to open such that neither of the shafts 160a, 160b is coupled to the central clutch gear 110 and therefore the output shaft 172 is not driven by either of the shafts 160a, 160b.

In this embodiment, the controller 500 can automatically shift the DCT 100 between the high and low gears by controlling the clutches 106a, 106b and the shifter 190. For instance, the controller 500 can determine whether to operate the DCT 100 in the high or low gear based on vehicle parameters (e.g., a speed and/or acceleration of the vehicle 10) and automatically shift to the high or low gear based on those vehicle parameters. This can contribute to facilitating operation of the vehicle 10 and may make its operation more intuitive.

As shown in FIG. 10, the controller 500 has a processor unit 502 for carrying out executable code, and a non-transitory memory unit 504 that stores the executable code in a non-transitory medium (not shown) included in the memory unit 504. The processor unit 502 includes one or more processors for performing processing operations that implement functionality of the controller 500. The processor unit 502 may be a general-purpose processor or may be a specific-purpose processor comprising one or more preprogrammed hardware or firmware elements (e.g., application-specific integrated circuits (ASIC s), electrically erasable programmable read-only memories (EEPROMs), etc.) or other related elements. The non-transitory medium of the memory unit 504 may be a semiconductor memory (e.g., read-only memory (ROM) and/or random-access memory (RAM)), a magnetic storage medium, an optical storage medium, and/or any other suitable type of memory. While the controller 500 is represented as being one control unit in this implementation, it is understood that the controller 500 could comprise separate control units for controlling components separately and that at least some of these control units could communicate with each other. It is contemplated that the controller 500 could be the ECM or be in communication therewith.

It is contemplated that, in other embodiments, the shifter 190 may be mechanical in nature instead of electronic. In such embodiments, the gear setting control input 196 could be a shifter knob that is movable by the driver to different positions associated with the different gear settings of the DCT 100. Therefore, the electronic actuator 194 would be omitted and the shifter knob would be operatively connected to the dog clutch 192 by a plurality of links.

With reference to FIG. 6, the sub-transmission 170 has two output driving members 200, 202 for transmitting motion to the front wheels 14 and to the rear wheels 18 respectively. In this embodiment, the output driving member 200 is a driving bevel gear 200 that is mounted to the output shaft 172 for rotation therewith. The driving bevel gear 200 is disposed near a right end of the output shaft 172 (rightward from the driven sprocket 177). The driving bevel gear 200 is meshed with a driven bevel gear 204 that is mounted to a front propeller shaft 206. The front propeller shaft 206 is operatively connected to the front wheels 14 to drive the front wheels 14. The front propeller shaft 206 defines a front propeller shaft axis 205 extending generally longitudinally. Furthermore, in this embodiment, the front propeller shaft 206 is operatively connected to a front differential assembly 210 (illustrated schematically in FIG. 6) which in turn is operatively connected to the front wheels 14 via respective axles. The front differential assembly 210 includes an electronic selector 212 for selectively connecting the front propeller shaft 206 to the front wheels 14 based on a user input communicated to the electronic selector 212. As such, the front wheels 14 can be disconnected from or connected to the front propeller shaft 206.

As shown in FIG. 6, in this embodiment, the output driving member 202 is a driving helical gear 202 that is mounted to the output shaft 172 for rotation therewith. The driving helical gear 202 is disposed axially between the transmission gears 176, 178. The driving helical gear 202 is meshed with a driven helical gear 220 disposed rearwardly of the driving helical gear 202. In this embodiment, the driven helical gear 220 is connected to the transaxle 222 which includes a rear differential assembly 223 that receives the axles of the left and right rear wheels 18 to drive the rear wheels 18. It is contemplated that, in some embodiments, the rear differential assembly 223 could be provided on its own (i.e., not part of a transaxle). For instance, in such embodiments, the rear differential assembly 223 could be disposed outside of the housing 102 of the DCT 100 and operatively connected to the output shaft 172 via a rear propeller shaft.

Figure 9:
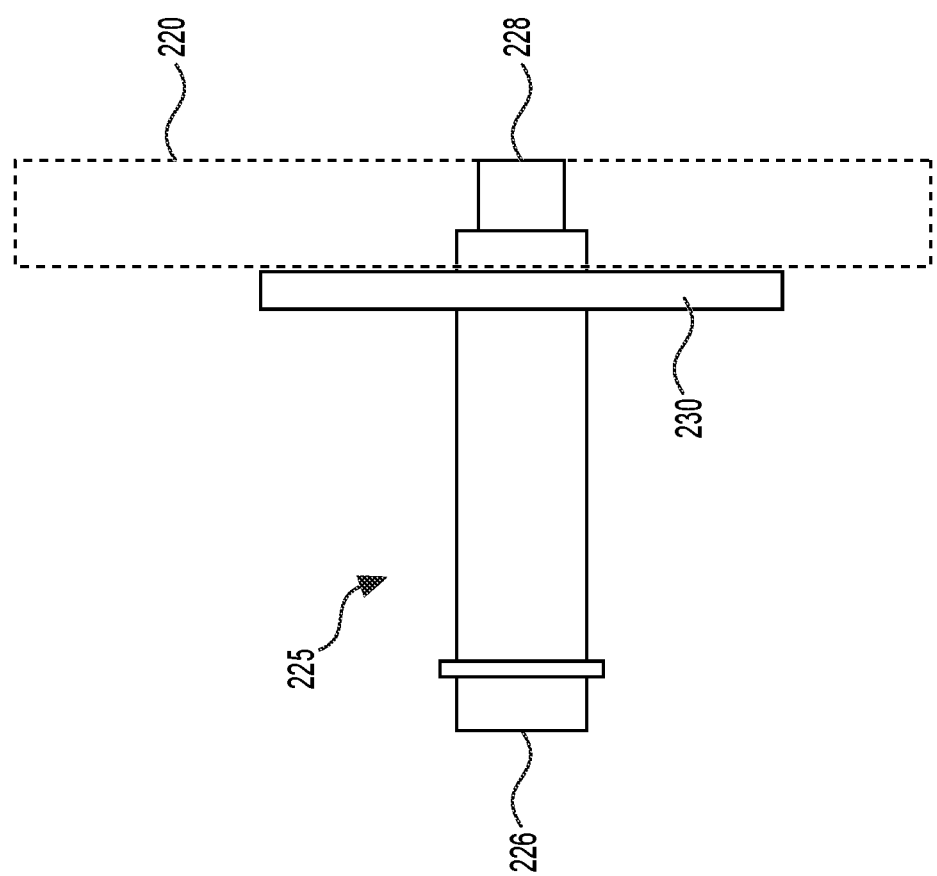
FIG. 9 is a front elevation view of a driven helical gear and a spool of the vehicle according to an alternative embodiment.

In an alternative embodiment, as shown in FIG. 9, the driven helical gear 220 could be connected to a spool 225 (e.g., a full spool) that is operatively connected to the rear wheels 18. The spool 225 has two opposite ends 226, 228 that are internally splined to receive the axles of the left and right rear wheels 18 for driving thereof. A flange 230 of the spool 225 is fastened to the driven helical gear 220 (shown in dashed lines in FIG. 9).

By combining the use of the of the CVT 60 and the dual-clutch 104 of the DCT 100, the performance of the vehicle 10 may be improved over conventional powertrain configurations having a CVT and a sub-transmission. In particular, problems associated with gear shifting in geared transmissions may be reduced as the capability of selectively opening and closing the clutches 106a, 106b allows the gear shifting of the sub-transmission 170 to take place on a corresponding one of the shafts 160a, 160b that is uncoupled to the central clutch gear 110. As such, the vehicle 10 does not need to be stopped to shift from low gear to high gear for example. This may thus provide a more seamless gear shifting experience to the driver. In addition, the dual-clutch 104 may also facilitate implementing different drive modes that use particular shifting patterns between the gear settings. The life cycle of the transmission belt 68 of the CVT 60 may also be prolonged since the dual-clutch 104 allows the vehicle 10 to start moving with the low gear engaged without having to subsequently stop the vehicle 10 if a shift to the high gear is desired. Therefore, when the vehicle 10 starts moving, torque can always be transmitted by the transmission belt 68 with the low gear engaged which places less strain on the transmission belt 68. The use of the dual-clutch 104 may also minimize torque interruptions in the drivetrain of the vehicle 10, and the performance of the vehicle 10 in off-road conditions may be improved. In addition, the combination of the CVT 60 and the dual-clutch 104 may offer a quieter performance compared to conventional powertrain configurations that are often characterized by noises caused by grinding or impacting gears.

Figure 11:
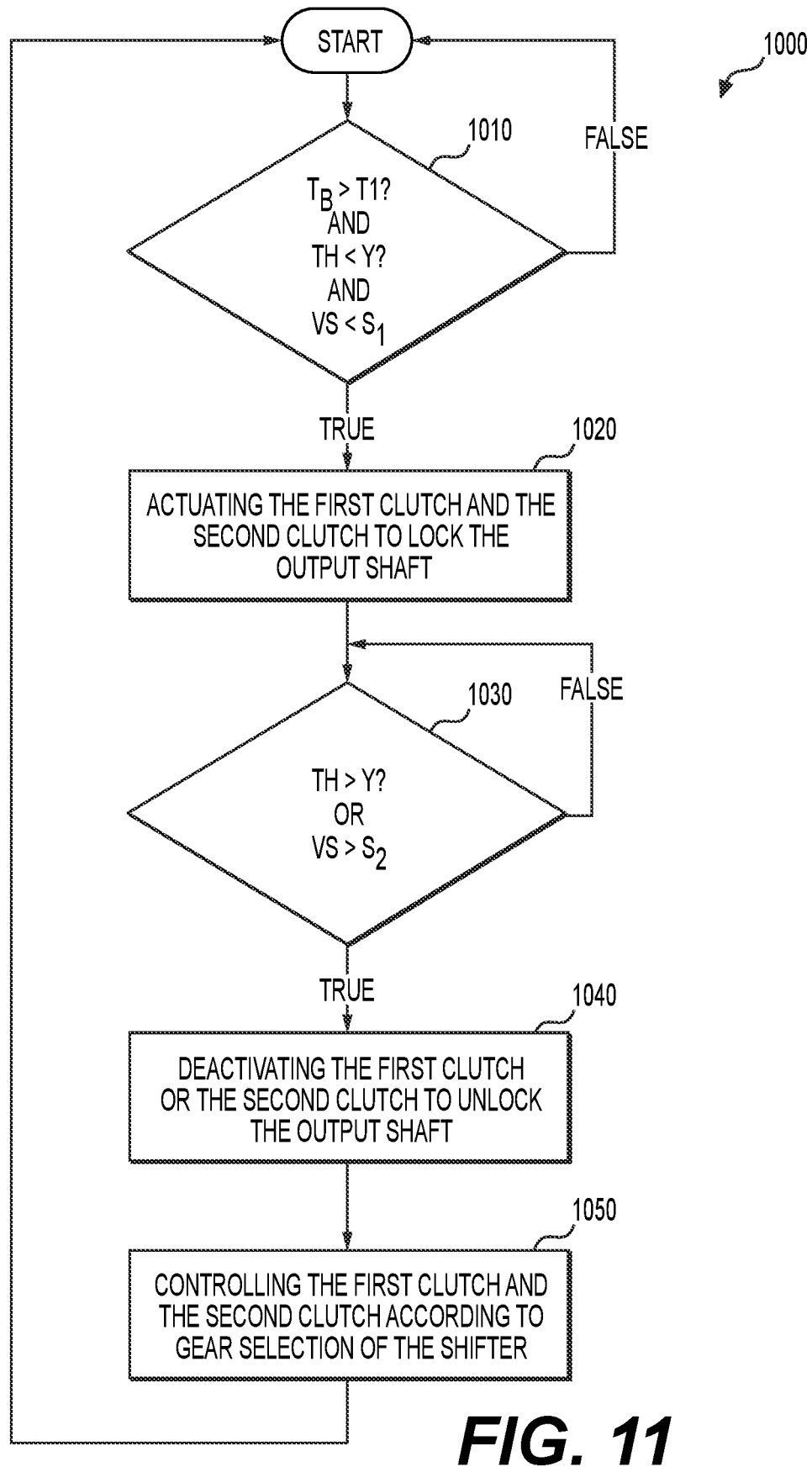
FIG. 11 is a flow diagram of a method for operating the vehicle of FIG. 1 according to an embodiment of the present technology.

With reference to FIG. 11, as mentioned above, in some embodiments, both clutches 106a, 106b of the dual-clutch 104 could be closed at the same time according to a method 1000 for operating the vehicle 10. The method 1000 begins with step 1010 in which the controller 500 determines if the vehicle 10 is substantially stationary. The term "substantially stationary" refers to the vehicle 10 being either immobile or very close to immobile. In this embodiment, the vehicle 10 is determined to be substantially stationary based on a plurality of operating parameters of the vehicle 10. In particular, in this example, the controller 500 considers three operating parameters of the vehicle 10 to determine if the vehicle 10 is substantially stationary. In particular, one of the operating parameters of the vehicle 10 is a duration of activation of the brake system 38 of the vehicle 10, represented in FIG. 11 as time $T_B$. The duration of activation of the brake system 38 is the amount of time that the brake system 38 has been activated continuously (i.e., how long the brake pedal of the vehicle 10 is being held down by the driver). Another one of the operating parameters of the vehicle 10 is an operating parameter indicative of a throttle request of the engine 50. The operating parameter indicative of the throttle request of the engine 50 namely indicates a throttle request TH from the engine 50. In this embodiment, the operating parameter indicative of the throttle request of the engine 50 is the position of the accelerator 41, as transmitted to the controller 500 by the accelerator position sensor 41 (FIG. 10). A full throttle level (i.e., 100% throttle level) therefore corresponds to the accelerator 40 being completely pressed down by the driver. It is contemplated that other operating parameters indicative of the throttle request of the engine 50 could be used instead in other embodiments (e.g., a position of the throttle valve of the engine 50). In this embodiment, the third operating parameter of the vehicle 10 used to determine if the vehicle 10 is substantially stationary is a speed VS of the vehicle 10, as transmitted to the controller 500 by a speed sensor 515 (FIG. 10).

To determine if the vehicle 10 is substantially stationary, at step 1010, the controller 500 compares the time $T_B$ to a predetermined brake activation time T1. In this example, the predetermined brake activation time T1 is 0.5 seconds. The controller 500 also compares the throttle request TH indicated by the operating parameter indicative of the throttle request of the engine 50 to a predetermined throttle level Y. In this example, the predetermined throttle level Y is 1% (i.e., indicative of a 1% opening of the throttle valve). The controller 500 also compares the speed VS of the vehicle 10 to a predetermined vehicle speed $S_1$. In this example, the predetermined vehicle speed $S_1$ is 1 km/h. In this embodiment, if the time $T_B$ is greater than the predetermined brake activation time T1, the throttle request TH indicated by the operating parameter indicative of the throttle request of the engine 50 is less than the predetermined throttle level Y, and the speed VS of the vehicle 10 is less than the predetermined vehicle speed $S_1$, then the controller 500 determines that the vehicle 10 is substantially stationary.

It is contemplated that, in other embodiments, only one or two of the operating parameters of the vehicle 10 could be used to determine if the vehicle 10 is substantially stationary.

If the controller 500 determines that the vehicle 10 is not substantially stationary (i.e., nonstationary), the method 1000 returns to the beginning of the method 1000 (i.e., keeps determining if the vehicle is substantially stationary). If the controller 500 determines that the vehicle 10 is substantially stationary, the method 1000 proceeds to step 1020. At step 1020, in response to determining that the vehicle 10 is substantially stationary, the controller 500 actuates both clutches 106a, 106b to cause simultaneous driving engagement of both shafts 160a, 160b with the output shaft 172 of the sub-transmission 170. Since the gear ratio established between the transmission gears 166, 178 is different from the gear ratio established between the transmission gears 162, 176, and from the gear ratio established between the sprockets 164, 177 (in addition to providing rotation in opposite directions), causing the simultaneous driving engagement of both shafts 160a, 160b with the output shaft 172 locks the output shaft 172. That is, the output shaft 172 cannot be rotated in either rotation direction. As such, the DCT 100 temporarily prevents the vehicle 10 from moving forward or in reverse without having to put the vehicle 10 into park or keeping the brakes 39 activated. This may be particularly useful for drivers that have to frequently exit the vehicle 10 for short durations of time (e.g., workers).

Once both the clutches 106a, 106b have been actuated to lock the output shaft 172, the method 1000 proceeds to step 1030. At step 1030, the controller 500 either receives a request from the accelerator 41 to increase the throttle request from the engine 50 such that the throttle request TH indicated by the operating parameter indicative of the throttle request of the engine 50 is greater than the predetermined throttle level Y, or the controller 500 determines that the vehicle 10 is nonstationary (i.e., if it has started moving). In this embodiment, the controller 500 determines if the vehicle 10 is nonstationary based on the speed VS of the vehicle 10. In particular, in this embodiment, the controller 500 determines that the vehicle 10 is nonstationary in response to the speed VS of the vehicle 10 being greater than a predetermined vehicle speed $S_2$. In this example, the predetermined vehicle speed $S_2$ is 10 km/h.

If at step 1030 the controller 500 has not received the request to increase the throttle from the engine 50 to a level greater than the predetermined throttle level Y, or if the controller 500 determines that the vehicle 10 is not nonstationary (i.e., stationary), the method 1000 keeps repeating the step 1030. On the other hand, if the controller 500 receives the request to increase the throttle to a level greater than the predetermined throttle level Y, or the controller 500 determines that the vehicle 10 is nonstationary, the method 1000 proceeds to step 1040. At step 1040, the controller 500 deactivates the left clutch 106a or the right clutch 106b to release driving engagement of the shaft 160a (if deactivating the left clutch 106a) or the shaft 160b (if deactivating the right clutch 106b) with the output shaft 172 of the sub-transmission 170. The output shaft 172 is therefore unlocked as soon as the left clutch 106a or the right clutch 106b is deactivated.

Next, the method 1000 proceeds to step 1050 whereby the controller 500 returns to controlling the clutches 106a, 106b according to the gear selection of the shifter 190 of the vehicle 10 as during regular operation. That is, the controller 500 determines the appropriate gear selection based on operating parameters (e.g., vehicle speed) and/or on a user input at the gear setting control input 196. The method 1000 can then once again start from the beginning.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for operating a vehicle comprising a dual-clutch transmission (DCT), the DCT comprising:
   a clutch input member operatively connected to an engine of the vehicle;
   a first clutch;
   a second clutch;
   a first shaft operatively connected to the first clutch, the first clutch being selectively actuated to couple the first shaft to the clutch input member;
   a second shaft operatively connected to the second clutch, the second clutch being selectively actuated to couple the second shaft to the clutch input member;
   at least one first driving member mounted to the first shaft;
   at least one second driving member mounted to the second shaft; and
   an output shaft operatively connecting the at least one first driving member and the at least one second driving member to at least one of a plurality of ground-engaging members of the vehicle;
   the method comprising:
   determining if the vehicle is substantially stationary based on at least one operating parameter of the vehicle; and
   in response to determining that the vehicle is substantially stationary, actuating the first clutch and the second clutch to cause simultaneous driving engagement of both the first shaft and the second shaft with the output shaft to thereby lock the output shaft.

2. The method of claim 1, wherein the at least one operating parameter of the vehicle includes at least one of:
   a duration of activation of a brake system of the vehicle;
   an operating parameter indicative of a throttle request of the engine; and
   a speed of the vehicle.

3. The method of claim 2, wherein the vehicle is determined to be substantially stationary in response to:
   the duration of activation of the brake system being greater than a predetermined brake activation time;
   the operating parameter indicative of the throttle request of the engine indicating that the throttle request is less than a predetermined throttle level; and
   the speed of the vehicle being less than a predetermined vehicle speed.

4. The method of claim 3, wherein the predetermined brake activation time is 0.5 seconds.

5. The method of claim 3, wherein the predetermined throttle level is 1%.

6. The method of claim 3, wherein the predetermined vehicle speed is 1 km/h.

7. The method of claim 2, wherein the operating parameter indicative of the throttle request is a position of an accelerator of the vehicle.

8. The method of claim 1, further comprising:
   after actuating the first clutch and the second clutch, determining if the vehicle is nonstationary;
   in response to receiving a request for increasing a throttle request of the engine to a throttle level greater than a predetermined throttle level or determining that the vehicle is nonstationary:
      deactivating one of the first clutch and the second clutch to release driving engagement of a corresponding one of the first shaft and the second shaft with the output shaft; and
      controlling the first clutch and the second clutch according to a gear selection of a shifter of the vehicle.

9. The method of claim 8, wherein the vehicle is determined to be nonstationary in response to a speed of the vehicle being greater than a predetermined vehicle speed.

10. A vehicle comprising:
    a frame;
    a plurality of ground-engaging members operatively connected to the frame;
    an internal combustion engine supported by the frame, the engine comprising a crankshaft configured to drive at least one of the ground-engaging members;
    a dual-clutch transmission (DCT) operatively connected to the engine, the DCT comprising:
       a clutch input member operatively connected to a driven pulley of a continuously variable transmission (CVT) to be driven thereby;
       a first clutch;
       a second clutch;
       a first shaft operatively connected to the first clutch, the first clutch being selectively actuated to couple the first shaft to the clutch input member;
       a second shaft operatively connected to the second clutch, the second clutch being selectively actuated to couple the second shaft to the clutch input member;
       at least one first driving member mounted to the first shaft;
       at least one second driving member mounted to the second shaft; and
       an output shaft operatively connecting the at least one first driving member and the at least one second driving member to the at least one of the ground-engaging members;
    and
    a controller configured to control actuation of the first clutch and the second clutch, the controller being operable to:
       determine if the vehicle is substantially stationary based on at least one operating parameter of the vehicle; and
       in response to determining that the vehicle is substantially stationary, actuate the first clutch and the second clutch to cause simultaneous driving engagement of both the first shaft and the second shaft with the output shaft to thereby lock the output shaft.

11. The vehicle of claim 10, wherein the DCT comprises a sub-transmission operatively connected to the first shaft and the second shaft, the sub-transmission comprising:
   the output shaft;
   at least one first sub-transmission driven member mounted to the output shaft, the at least one first driving member being in driving engagement with the at least one first sub-transmission driven member; and
   at least one second sub-transmission driven member mounted to the output shaft, the at least one second driving member being in driving engagement with the at least one second sub-transmission driven member,
   a gear ratio between the at least one first driving member and the at least one first sub-transmission driven member being different from a gear ratio between the at least one second driving member and the at least one second sub-transmission driven member.

12. The vehicle of claim 10, wherein the at least one operating parameter of the vehicle includes at least one of:
   a duration of activation of a brake system of the vehicle;
   an operating parameter indicative of a throttle request of the engine; and
   a speed of the vehicle.

13. The vehicle of claim 12, wherein the controller determines that the vehicle is substantially stationary in response to:
   the duration of activation of the brake system being greater than a predetermined brake activation time;
   the operating parameter indicative of the throttle request of the engine indicating that the throttle request is less than a predetermined throttle level; and
   the speed of the vehicle being less than a predetermined vehicle speed.

14. The vehicle of claim 13, wherein the predetermined brake activation time is 0.5 seconds.

15. The vehicle of claim 13, wherein the predetermined throttle level is 1%.

16. The vehicle of claim 13, wherein the predetermined vehicle speed is 1 km/h.

17. The vehicle of claim 12, wherein the operating parameter indicative of the throttle request is a position of an accelerator of the vehicle.

18. The vehicle of claim 10, wherein:
   the vehicle further comprises a shifter for operating the DCT in at least two different gear settings; and
   the controller is operable to:
      after actuating the first clutch and the second clutch, determine if the vehicle is nonstationary; and
      in response to receiving a request for increasing a throttle request of the engine to a throttle level greater than a predetermined throttle level or determining that the vehicle is nonstationary:
         deactivate one of the first clutch and the second clutch to release driving engagement of a corresponding one of the first shaft and the second shaft with the output shaft; and
         control the first clutch and the second clutch according to the gear setting selected by the shifter.

19. The vehicle of claim 18, wherein the vehicle is determined to be nonstationary in response to a speed of the vehicle being greater than a predetermined vehicle speed.

\* \* \* \* \*